Nov. 14, 1933.　　　G. P. FULLER　　　1,935,441

VALVE STEM ASSEMBLING MACHINE

Filed April 8, 1933

Inventor

George P. Fuller.

By A. J. O'Brien

Attorney

Patented Nov. 14, 1933

1,935,441

UNITED STATES PATENT OFFICE 1,935,441

VALVE STEM ASSEMBLING MACHINE

George P. Fuller, Denver, Colo., assignor to The Gates Rubber Company, Denver, Colo., a corporation of Colorado Application April 8, 1933. Serial No. 665,138

1 Claim. (Cl. 29—84)

This invention relates to improvements in machines for applying nuts to bolts and has reference more particularly to a machine for use in threading nuts onto valve stems, such as are used in connection with inner tubes for pneumatic tires.

In the building of inner tubes for pneumatic tires, each tube is provided with a valve stem which is held in place by a nut that has threaded engagement with the stem.

Until lately the stems employed in connection with pneumatic tires have been straight and machines have been invented and extensively used for applying the nuts to the straight stems and for tightening them so as to form an air-tight joint between the stem and the material of the inner tube.

It is now customary to construct automobile wheels in a different manner from which these wheels have previously been constructed with the result that it becomes necessary, in order to facilitate inflation of the tires, to make the valve stems crooked so that the end of the valve stem will be readily accessible for inflation.

It is evident that a machine that is adapted for use only with straight valve stems could not be used with crooked valve stems and this has made it necessary to apply the nuts and tighten them by hand whenever crooked valve stems were used.

It is the object of this invention to produce a machine of the type above mentioned, which shall be so constructed that it can be employed for applying nuts to crooked valve stems, as well as to straight valve stems and thus obviate the necessity of slow hand labor when crooked valve stems are employed.

In order to describe the invention so that it may be readily understood, reference will now be had to the accompanying drawing in which the preferred embodiment thereof has been illustrated, and in which.

Figure 1:
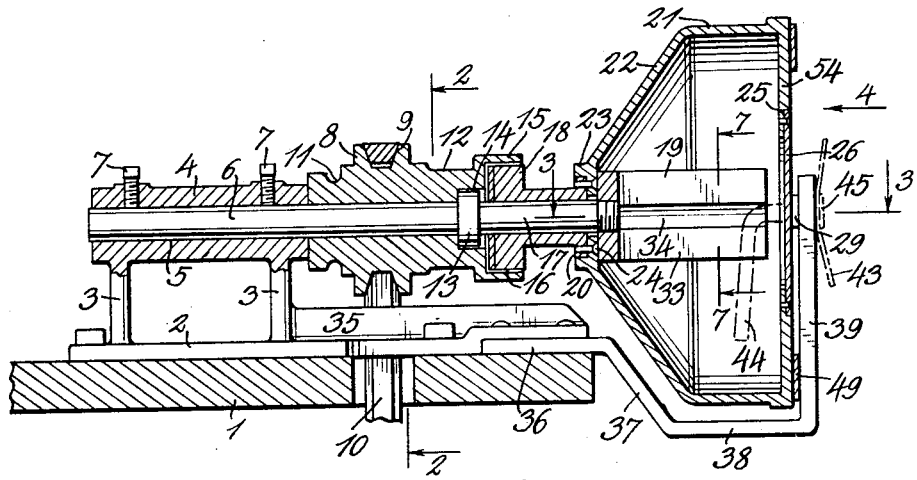
Fig. 1 is a vertical section through the machine that forms the subject of this invention showing the same in place on a support.
Figure 2:
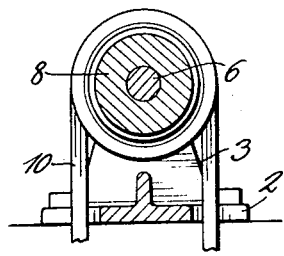
Fig. 2 is a transverse section taken on line 2—2, Fig. 1.

In the drawing reference numeral 1 represents a support which may be the top of a table or a bench and reference numeral 2 designates the bottom portion of a base which is preferably made from some moldable material and which is provided with two upwardly extending brackets 3 near one end. The brackets are connected by a cylindrical member 4 which has an axial opening 5 extending therethrough. A shaft 6 is located in the opening 5 and is held against turning and against longitudinal movement by means of set screws 7. The shaft projects beyond the front end of member 4 and has mounted thereon a rotatable member 8. This member has a V-shaped groove 9 in its outer surface for the reception of a V-shaped belt 10. It may also be provided with a groove 11 for cooperation with a round belt and with a cylindrical surface 12 for use in connection with a flat belt. The shaft is provided with a collar 13 that serves as a stop and is normally located in the cylindrical recess 14 in one end of member 8. Member 8 is also provided with a clutch member which consists of a cylindrical portion 15 that has a cylindrical opening 16 therein. Located on the end of the shaft beyond the collar 13 and which has been designated by reference numeral 17, is a clutch member 18. This clutch member is freely rotatable on the shaft and is held against removal by the forked member 19 to which reference will be made hereinafter. The clutch member 18 has an outwardly extending flange 20 to which a drumlike member 21 is secured. Member 21 has a cylindrical surface which is connected by means of a frusto-conical surface 22 with the hub portion 23. Screws 24 serve to connect the drum to the flange 20 as shown clearly in Figs. 1 and 3. The drum has one end partially closed by an inwardly extending flange 54. This flange has a central opening about which is a rabbet 25 in which is located a removable plate 26. Plate 26 is held in place by means of screws 27 and is provided with an opening 28 which is concentric with the axis about which the drum rotates. Located in the opening is a socket 29 that has a polygonal inner surface 30 which is adapted to engage a nut in a manner which will be hereinafter described.

Figure 6:
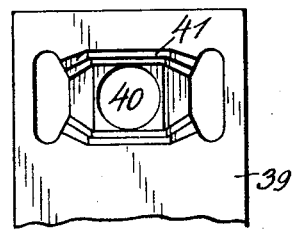
Fig. 6 is a side elevation of the top plate looking in the direction of arrow 6, Fig. 5.
Figure 8:
Fig. 8 is a section similar to that shown in Fig. 5, but showing a slightly modified form of construction.
Figure 7:
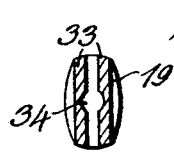
Fig. 7 is a transverse section taken on line 7—7, Fig. 1.

Member 19, which holds the drum and the clutch member 18 against removal, is formed, preferably from a single member, and has its inner end provided with a threaded opening 31 which receives the threaded end portion 32 of shaft 17. Member 19 has two parallel spaced fingers or plates 33 which extend to a point a short distance from the inner surface of plate 26, as shown most clearly in Fig. 3. In some instances the fingers 33 are provided with arcuate opposed recesses 34, although this is not considered to be an essential feature of the invention. The base 2 extends to a point substantially below the clutch member 18 and is provided with a strengthening rib 35. Secured to the end of the base member 2 is a bracket which is preferably formed from a steel bar whose end 36 is located in a recess in the bottom of the base and secured to the latter by means of bolts or rivets. The bracket has an inclined portion 37 which terminates in a portion 38 that is parallel with part 36 and this again terminates in an end portion 39 that extends upwardly in front of the drum in the manner shown in Fig. 1. The upwardly extending portion 39 is provided with an opening 40 that is located so as to be concentric with the axis of rotation and the outer surface has indentations as indicated by reference numeral 41 in Fig. 6. These indentations are designed to receive the plates 42 that are secured to the inner tubes 43 by the valve stems.

In the drawing an inner tube 43 has been shown and extending through this is a valve stem 44 which has a circular head 45 on the inside of the inner tube. In Fig. 1 the valve stem has been shown by dot and dash lines and from this it can be seen that it is formed from two angularly related sections which, in the case illustrated, makes angles of substantially ninety degrees with each other. The valve stems are each provided with a threaded portion 46 which is adapted to receive a nut 47. The threaded sections have also flattened surfaces 48 which prevent the plates 42 from rotating on the valve stem.

Since the construction of the ordinary valve stem and its method of attachment to an inner tube is well known, it will not be further described in this application.

Let us now assume that the machine that has been described above and illustrated in the drawing is securely mounted on a support and that member 8 is rotated at the required speed by means of the belt 10. Although the drumlike member 22 that is attached to the clutch member 18 is freely rotatable on the shaft, it will not as a rule, rotate because the only force tending to produce such rotation is the friction between that portion of the shaft marked 17 and the bearing in the clutch member. If force is applied to the drum which tends to move it against the member 8, the inner end of the clutch member 18 will engage the rotating surface of clutch member 15 and sufficient torque will thus be produced to rotate the drum. As soon as the pressure on the drum is released, it will stop and in order to facilitate the stopping it is sometimes desirable to provide the upwardly extending arm 39 with some friction material 49 which will engage the outer surface of the drum and act as a brake. When the machine is used for putting nuts on valve stems, the member 49 is not often necessary because the drum will expand its kinetic energy in tightening the nut.

When the machine is to be employed, the member 42 is put onto the valve stem, after which the nut 47 is put in place and given a turn so as to make the thread of the nut properly engage the threads on the valve stem. The valve stem is now introduced through the opening 40 and through the opening in the socket 29 and the end of the valve stem is placed in between the fingers 33 and permitted to extend downwardly as shown in Fig. 1. As soon as the nut comes into engagement with the socket 30 and a slight force is applied, the drum and the clutch member 18 will move inwardly, whereupon the clutch will function to rotate the drum which, in turn, will rotate the nut on the valve stem and as soon as the nut is properly tightened, the drum will stop because the friction between the two clutch members is so proportioned that it will permit the parts to slip without exerting an undue torque on the nut.

When the pressure on the drum is released, it will stop and the valve stem is then withdrawn and another one inserted. For the different size inner tubes, different sized plates 42 are used, and there are, as a rule, three sizes of plates in common use and therefore three sets of depressions 41 are provided so as to engage any of the three sizes of plates.

Figure 3:
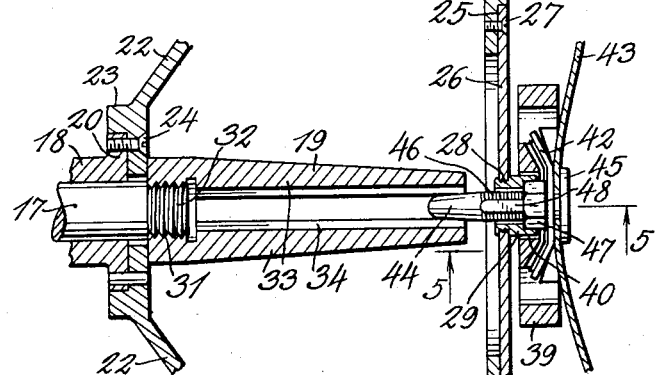
Fig. 3 is a section taken on line 3—3, Fig. 1, and shows the means for holding the valve stem against turning.
Figure 4:
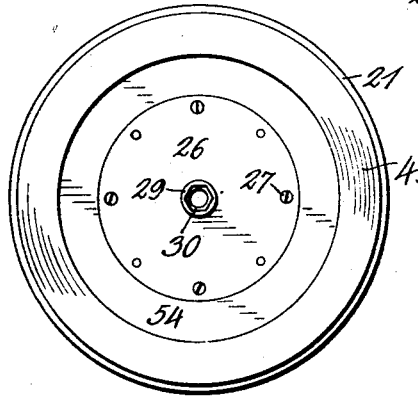
Fig. 4 is a front view of the drumlike member.
Figure 5:
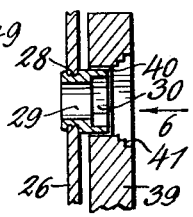
Fig. 5 is a section taken on line 5—5, Fig. 3.

The machine described above is especially well adapted for use with curved valve stems because the means for preventing the stems from rotating is locked on the inside of the drum and held against rotation by the stationary shaft 6 to whose end 17 it is connected as shown in Fig. 3. Although the machine is designed more particularly with reference to crooked valve stems, it can be used with equal success with straight valve stems as the latter can be extended into the space between the fingers 33. The arcuate grooves 34 are provided to give room for straight valve stems. By spacing the fingers 33 apart a sufficient distance to permit any straight valve stem to be rotated therein, the depressions 34 can be dispensed with. The upwardly extending plate 39 serves the purpose of a stop and prevents the operator from exerting an unduly great force on the drum and it also serves to prevent the stem from turning because the plates 42 have openings provided with flattened sides that engage the flat surface 48 and when the plates 42 are held against rotation, they will prevent the valve stem from turning.

It will be seen from the above description that by making the drum 22 of sufficient size to permit the valve stem to be introduced into it in the manner shown in Fig. 1 and providing holding means 19 secured to the shaft, it is possible to apply nuts to crooked valve stems as easily as it has heretofore been possible to apply similar nuts to straight valve stems.

In the drawing the clutch has been shown as having frictional engagement in a plane perpendicular to the axis of rotation, but it is also possible to modify the clutch so as to have frusto-conical surfaces in engagement with each other wherever this should be found desirable.

Having described the invention what is claimed as new is:

In a power operated wrench of the type used for applying nuts to valve stems, in combination, a base having an elongated bearing near one end, a shaft having one end located in the bearing and clamped against movement relative to the bearing, a pulley rotatably mounted on the shaft adjacent the bearing, a collar on the shaft on the opposite side of the pulley from the bearing, the pulley being provided with a counterbore for the reception of the collar, the pulley being also provided with a second counterbore whose bottom is spaced from the bottom of the first counterbore a distance greater than the thickness of the collar, a clutch member rotatably carried by the shaft beyond the collar, a friction surface on the end of the clutch member for engaging the surface of the second counterbore, a stop at the end of the shaft for limiting the movement of the clutch member away from the cooperating friction surface of the second counterbore, a hollow wrench member secured to the clutch member, and said stop having a pair of spaced arms extending to each side and parallel to the axis of the shaft and positioned centrally of the hollow members.

GEORGE P. FULLER.